(12) United States Patent
Bok et al.

(10) Patent No.: US 12,395,314 B2
(45) Date of Patent: Aug. 19, 2025

(54) SYSTEMS AND METHODS FOR MINIMIZING IMPACT OF BREACH OF ENCRYPTION AND SIGNING KEYS IN MULTI-CLOUD ENVIRONMENTS

(71) Applicant: JPMORGAN CHASE BANK, N.A., New York, NY (US)

(72) Inventors: Reetu Bok, Philadelphia, PA (US); Dipti Ahuja, Basking Ridge, NJ (US); Bipin More, Edison, NJ (US); Neeraj Tati, Fremont, CA (US); Valanka Fernandes, Edison, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 253 days.

(21) Appl. No.: 18/066,116

(22) Filed: Dec. 14, 2022

(65) Prior Publication Data

US 2024/0204985 A1 Jun. 20, 2024

(51) Int. Cl.
| | |
|---|---|
| *H04L 9/00* | (2022.01) |
| *H04L 9/06* | (2006.01) |
| *H04L 9/08* | (2006.01) |
| *H04L 9/14* | (2006.01) |

(52) U.S. Cl.
CPC ............ *H04L 9/002* (2013.01); *H04L 9/0631* (2013.01); *H04L 9/0822* (2013.01); *H04L 9/0825* (2013.01); *H04L 9/0894* (2013.01); *H04L 9/14* (2013.01)

(58) Field of Classification Search
CPC ..... H04L 9/002; H04L 9/0631; H04L 9/0822; H04L 9/0825; H04L 9/0894; H04L 9/14
See application file for complete search history.

(56) References Cited

U.S. PATENT DOCUMENTS

| | | | |
|---|---|---|---|
| 9,749,174 B1* | 8/2017 | Goff ................... | H04L 67/1004 |
| 10,805,070 B2* | 10/2020 | Wall ................... | G06Q 20/3829 |
| 2018/0048464 A1* | 2/2018 | Lim .................... | H04L 63/0442 |
| 2022/0104100 A1* | 3/2022 | M ....................... | H04W 84/18 |

FOREIGN PATENT DOCUMENTS

WO 2018031702 2/2018

OTHER PUBLICATIONS

International Search Report and Written Opinion of the International Searching Authority, dated Mar. 1, 2024, from corresponding International Application No. PCT/US2023/080088.

* cited by examiner

*Primary Examiner* — Linglan Edwards
*Assistant Examiner* — Jacob Benedict Knackstedt
(74) *Attorney, Agent, or Firm* — GREENBERG TRAURIG LLP (57) ABSTRACT

A method for generating keys in a multi-cloud environment that minimizes the impact of a breach may include: generating and storing a first key encryption key (KEK) in a first environment key management service (KMS); generating a first data encryption key (DEK) using the first KMS; generating a second DEK for a second environment using the first KMS; encrypting the first DEK with the first KEK and the second DEK with the first KEK; storing the encrypted first DEK and the encrypted second DEK in a database; generating a second KEK and storing the second KEK in a second environment KMS; encrypting the first DEK with the second KEK and the second DEK with the second KEK; and storing the encrypted first DEK and the encrypted second DEK in the database.

12 Claims, 5 Drawing Sheets

SYSTEMS AND METHODS FOR MINIMIZING IMPACT OF BREACH OF ENCRYPTION AND SIGNING KEYS IN MULTI-CLOUD ENVIRONMENTS

BACKGROUND OF THE INVENTION

1. Field of the Invention

Embodiments generally relate to systems and methods for minimizing impact of breach of encryption and signing keys in multi-cloud environments.

2. Description of the Related Art

Large enterprises are often set up to run applications in multiple environments, including on-premises and in multi-cloud environments. With applications comes application data, including sensitive data that needs protected by encryption keys and/or signing keys. For resiliency and latency reasons, the enterprise may decide to keep the encryption and signing keys on every cloud environment. For example, on Amazon Web Services (AWS), an enterprise may use AWS Key Management Service to store their encryption and signing keys, whereas on-premises systems may have their own proprietary key management solution. If a single key is used across all regions, and if it is compromised, the entire application becomes unsecure.

SUMMARY OF THE INVENTION

Systems and methods for minimizing impact of breach of encryption and signing keys in multi-cloud environments are disclosed. In one embodiment, a method for generating keys may include: (1) generating, by a computer program executed by a first cloud environment, a first key encryption key and storing the first key encryption key in a first cloud environment key management service; (2) generating, by the computer program, a first data encryption key using the first cloud environment key management service; (3) generating, by the computer program, a second data encryption key for a second cloud environment using the first cloud environment key management service; (4) encrypting, by the computer program, the first data encryption key with the first key encryption key and the second data encryption key with the first key encryption key; (5) storing, by the computer program, the first data encryption key encrypted with the first key encryption key and the second data encryption key encrypted with the first key encryption key in a database of the first cloud environment; (6) generating, by the computer program, a second key encryption key and storing the second key encryption key in a second cloud environment key management service; (7) encrypting, by the computer program, the first data encryption key with the second key encryption key and the second data encryption key with the second key encryption key; and (8) storing, by the computer program, the first data encryption key encrypted with the second key encryption key and the second data encryption key encrypted with the second key encryption key in the database of the second cloud environment.

In one embodiment, the first data encryption key and the second data encryption key may include symmetric keys, such as symmetric AES 256 keys.

In one embodiment, the first data encryption key and the second data encryption key may include asymmetric keys.

In one embodiment, the method may also include: receiving, at a load balancer computer program for the first cloud environment and the second cloud environment and from a consumer application, a first consumer application request to encrypt data; routing, by the load balancer computer program, the first consumer application request and the data to one of the cloud environments based on a routing rule; retrieving, by an application instance in the one cloud environment, the first data encryption key from the database for the one cloud environment; decrypting, by the application instance and with a key encryption key for the one cloud environment, the first data encryption key; encrypting, by the application instance, the data with the decrypted first data encryption key; and returning, by the application instance, the encrypted data to the consumer application.

In one embodiment, the load balancer may route the first consumer application request to one of the cloud environments that is not undergoing healing.

In one embodiment, the method may also include: receiving, at a load balancer computer program for the first cloud environment and the second cloud environment and from a consumer application, a first consumer application request to decrypt data and an identifier for a data encryption key that was used to encrypt the data, wherein the identifier identifies the first data encryption key or the second data encryption key; routing, by the load balancer computer program, the first consumer application request and the data to one of the cloud environments based on a routing rule; retrieving, by an application instance in the one cloud environment, a data encryption key associated with the identifier from the database for the one cloud environment; decrypting, by the application instance and with a key encryption key for the one cloud environment, the retrieved data encryption key; decrypting, by the application instance, the data with the decrypted data encryption key; and returning, by the application instance, the decrypted data to the consumer application.

In one embodiment, the load balancer may route the first consumer application request to one of the cloud environments that is not undergoing healing.

In one embodiment, the method may also include: receiving, at a load balancer computer program for the first cloud environment and the second cloud environment and from a consumer application, a first consumer application request to decrypt data; routing, by the load balancer computer program, the first consumer application request and the data to one of the cloud environments based on a routing rule; retrieving, by an application instance in the one cloud environment, the first data encryption key and the second data encryption key; decrypting, by the application instance, the first data encryption key and the second data encryption key with the key encryption key for the one cloud environment; decrypting, by the application instance, the data with the decrypted first data encryption key and the second data encryption key; identifying, by the application instance, the valid decrypted data; and; and returning, by the application instance, the decrypted data to the consumer application.

In one embodiment, the load balancer routes the first consumer application request one of the cloud environments that is not undergoing healing.

According to another embodiment, a non-transitory computer readable storage medium, may include instructions stored thereon, which when read and executed by one or more computer processors, cause the one or more computer processors to perform steps comprising: generating a first key encryption key and storing the first key encryption key in a first cloud environment key management service; generating a first data encryption key using the first cloud environment key management service; generating a second data encryption key for a second cloud environment using the first cloud environment key management service; encrypting the first data encryption key with the first key encryption key and the second data encryption key with the first key encryption key; storing the first data encryption key encrypted with the first key encryption key and the second data encryption key encrypted with the first key encryption key in a database of the first cloud environment; generating a second key encryption key and storing the second key encryption key in a second cloud environment key management service; encrypting the first data encryption key with the second key encryption key and the second data encryption key with the second key encryption key; and storing the first data encryption key encrypted with the second key encryption key and the second data encryption key encrypted with the second key encryption key in the database of the second cloud environment.

In one embodiment, the first data encryption key may include a symmetric AES 256 key.

In one embodiment, the first data encryption key and the second data encryption key may include asymmetric keys.

In one embodiment, the first data encryption key and the second data encryption key may include symmetric keys.

In one embodiment, the non-transitory computer readable storage medium may also include instructions stored thereon, which when read and executed by one or more computer processors, cause the one or more computer processors to perform steps comprising: receiving, from a consumer application, a first consumer application request to encrypt data; routing the first consumer application request and the data to one of the cloud environments based on a routing rule; retrieving the first data encryption key from the key management service for the one cloud environment; decrypting, with a key encryption key for the one cloud environment, the first data encryption key; encrypting the data with the decrypted first data encryption key; and returning the encrypted data to the consumer application.

In one embodiment, the first consumer application request may be routed to one of the cloud environments that is not undergoing healing.

In one embodiment, the non-transitory computer readable storage medium may also include instructions stored thereon, which when read and executed by one or more computer processors, cause the one or more computer processors to perform steps comprising: receiving, from a consumer application, a first consumer application request to decrypt data and an identifier for a data encryption key that was used to encrypt the data, wherein the identifier identifies the first data encryption key or the second data encryption key; routing the first consumer application request and the data to one of the cloud environments based on a routing rule; retrieving a data encryption key associated with the identifier from the key management service for the one cloud environment; decrypting, with a key encryption key for the one cloud environment, the retrieved data encryption key; decrypting the data with the decrypted data encryption key; and returning the decrypted data to the consumer application.

In one embodiment, the first consumer application request may be routed to one of the cloud environments that is not undergoing healing.

In one embodiment, the non-transitory computer readable storage medium may also include instructions stored thereon, which when read and executed by one or more computer processors, cause the one or more computer processors to perform steps comprising: receiving, from a consumer application, a first consumer application request to decrypt data; routing the first consumer application request and the data to one of the cloud environments based on a routing rule; retrieving the first data encryption key and the second data encryption key; decrypting the first data encryption key and the second data encryption key with the key encryption key for the one cloud environment; decrypting the data with the decrypted first data encryption key and the second data encryption key; identifying valid decrypted data; and returning the valid decrypted data to the consumer application.

In one embodiment, the first consumer application request may be routed to one of the cloud environments that is not undergoing healing.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for minimizing impact of breach of encryption and signing keys in multi-cloud environments.

Embodiments may mitigate the risk of bringing down entire environments in response to a key being breached or compromised. Thus, in embodiments, an application may continue to function even if keys from one of its cloud environments are breached.

Embodiments may provide at least two sets of key management services (KMSs). KMSs generally do not have a mechanism for key sharing. Thus, embodiments provide a process of generating environment specific keys to mitigate the impact on data or operations due to breached/compromised keys in an environment.

Embodiments may provide Data Encryption Keys (DEKs) for each cloud environment. Thus, if there are two cloud environments, there will be two unique DEKs. Both DEKs will be copied on the two cloud environments. If there are three cloud environments, there will be three unique DEKs. All three DEKs will be copied on each cloud environment.

Embodiments provide a mechanism whereby keys may be securely copied for multiple environments and may be stored in each cloud environment to enable full functionality of an application even if keys from one environment is breached. The DEKs and KEKs may be identified by a key identifier, such as a key ID.

If the keys for one of the cloud environments are breached, the compromised keys may be marked as disabled in a database of each cloud environment. The breached cloud environment may be shut down and traffic may be routed to another environment. A load balancer may route all the traffic to the safe cloud environment and all the functionality of the application will continue to work for end user.

Once a new DEK is generated on the breached cloud environment, it may be copied in all the cloud environment and stored encrypted with KEK of that environment. Once system is up and running, the load balancer may be reconfigured to balance the traffic again and start routing traffic to newly up and running cloud environment.

Figure 1:
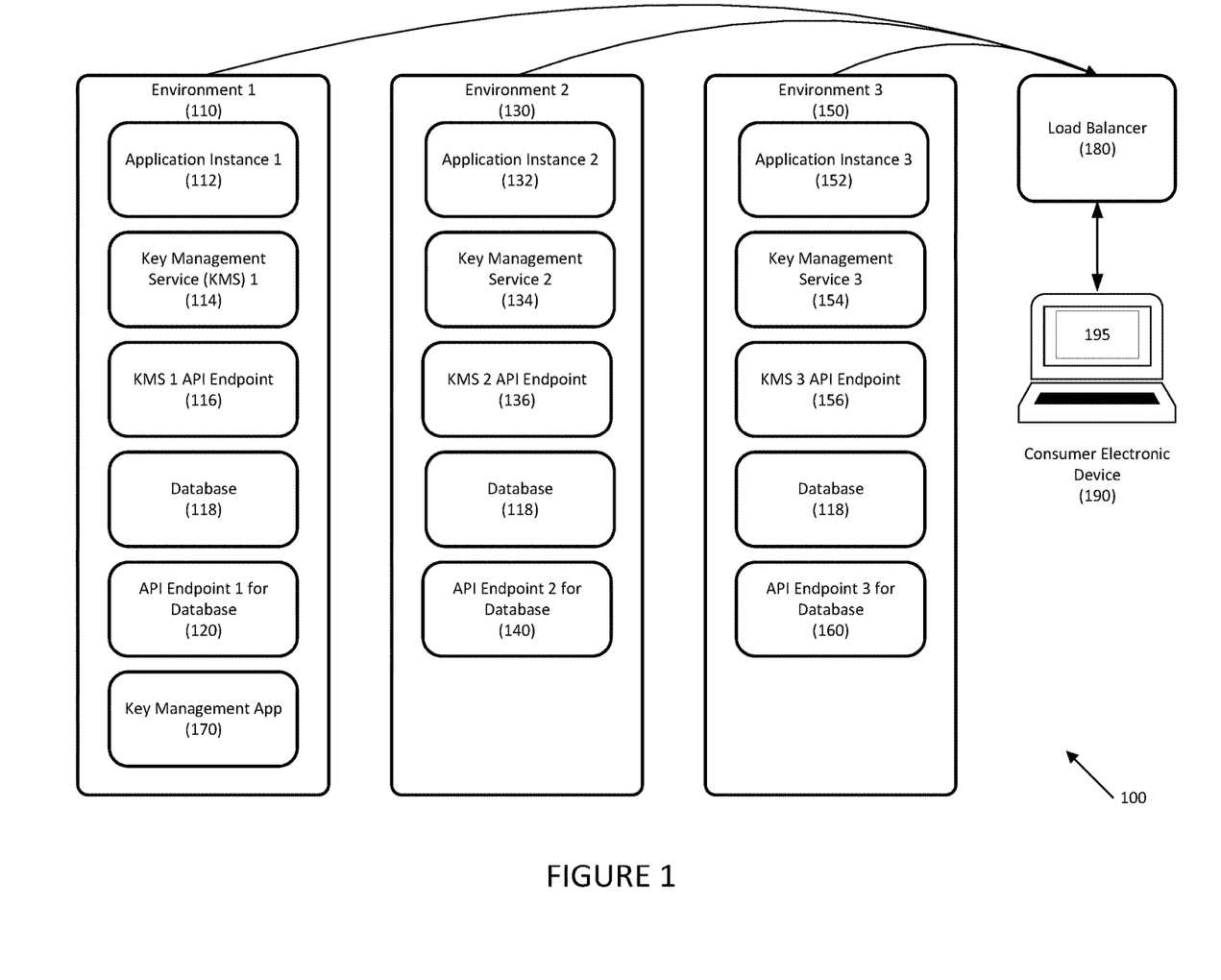
FIG. 1 depicts a system for minimizing impact of breach of encryption and signing keys in multi-cloud environments according to an embodiment.

Referring to FIG. 1, a system for minimizing impact of breach of encryption and signing keys in multi-cloud environments is disclosed according to an embodiment. System 100 may include cloud environments 110, 130, 150. Although FIG. 1 depicts three cloud environments, it should be recognized that additional or fewer cloud environments may be provided.

Cloud environments 110, 130, 150 may be on-premises cloud environments, third-party cloud environments, local storage, etc.

Each cloud environment 110, 130, 150 may include an instance of an application (e.g., application instance 112, 132, 152), key management services (e.g., key management service 1 114, key management service 2 134, key management service 3 154, etc.), KMS application programming instance (API) endpoints (e.g., KMS API endpoint 1 116, KMS API endpoint 2 136, KMS API endpoint 3 156), database 118, API database endpoints (e.g., API database endpoint 120, API database endpoint 140, API database endpoint 160), and load balancer 180. Load balancer may route an incoming request from, for example, consumer application 195 that may be executed on a consumer electronic device 190. Consumer electronic device 190 may be any suitable electronic device, including computers (e.g., workstations, desktops, laptops, notebooks, tablets, etc.), smart devices (e.g., smart phones, smart watches), kiosks (e.g., automated teller machines, customer self-help devices, etc.), Internet of Things (IOT) devices, terminals, etc.

Consumer application 195 may communicate a request to encrypt data, a request to decrypt data, a request to read or write data from database 118, etc.

In one embodiment, a plurality of consumer applications 195 and consumer electronic devices 190 may be provided.

Application instances 112, 132, 152 may be distributed instances of an application. The application may be any suitable application, including distributed applications hosted on multiple cloud infrastructure in an Infrastructure as a Service (IaaS), Platform as a Service (PaaS), or Service as a Service (SaaS) set up. Application instances 112, 132, 152 are language-agnostic. Each application instance 112, 132, 152 may have the same code base.

API database endpoints 120, 140, 160 may provide an API for database 118. Database 118 may be a multi-region database.

Key management application (app) 170 may be a distributed application that may manage the generation, distribution, and maintenance keys to cloud environments 110, 130, 150. In embodiments, key management app may run in only one environment (e.g., environment 1 110) and interacts with the other environments (e.g., environment 2 130 and environment 3 150) using, for example, KMS API endpoints 116, 136, 156. Note that while key management app 170 is depicted as being in environment 1 110 in FIG. 1, this is illustrative only.

Figure 2:
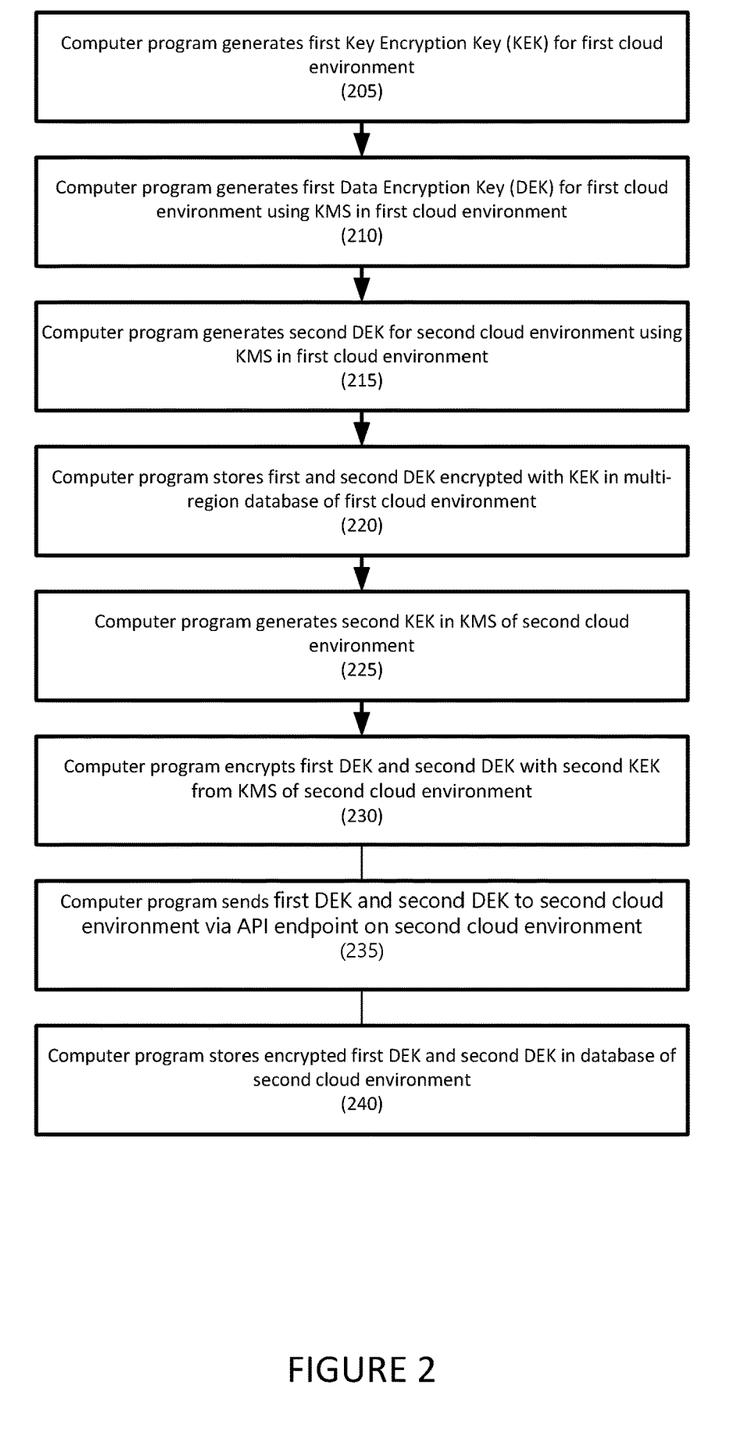
FIG. 2 depicts a method for key registration to minimize the impact of breach of encryption and signing keys in multi-cloud environments according to one embodiment.

Referring to FIG. 2, a method of generating keys that minimize an impact of breach of encryption and signing keys in multi-cloud environments is disclosed according to an embodiment.

In step 205, a computer program executed by a first cloud environment may generate a first key encryption key (e.g., KEK1). The first KEK may be a multi-region key. The first KEK may be stored in a key management service in the first cloud environment (KMS1) via, for example, a KMS API endpoint.

The first KEK may be a symmetric key, such as an AES 256 key. Other symmetric keys may be used as is necessary and/or desired.

In step 210, the computer program may generate a first Data Encryption Key (e.g., DEK1) for a first cloud environment using a KMS in first Cloud environment. The first DEK may have a first key identifier (e.g., keyID: 1). The first DEK may be an encryption key (symmetric) or signing key (asymmetric). The first DEK may be stored in a key management solution in the first cloud environment (e.g., KMS1) via KMS1 API endpoint.

The computer program may then fetch the plain and encrypted versions of the first DEK.

In step 215, the computer program may generate a second Data Encryption Key (e.g., DEK2) for a second cloud environment using the KMS in the first cloud environment. The second DEK may have a second DEK identifier (e.g., keyID: 2). The second DEK may be an encryption key (symmetric) or signing key (asymmetric). The second DEK may be stored in a key management solution in the first cloud environment (KMS1) via KMS1 API endpoint.

The computer program may then fetch the plain and encrypted versions of the second DEK.

In step 220, the computer program may store the first DEK and the second DEK that are encrypted with the KEK in a database of the first cloud environment. The database may maintain the DEK identifiers, the encrypted DEK values, the status of each DEK (e.g., active, inactive), the associated cloud environment (e.g., cloud 1, cloud 2, etc.), the KEK identifier for DEK identifier (e.g., KEK1), and a timestamp.

In step 225, the computer program may generate a second KEK (e.g., KEK2) that may also be a multi-region key. The second KEK may be stored in a key management solution in a second cloud environment (e.g., KMS2) via KMS2 API endpoint. The second KEK may be an asymmetric RSA2048 or EC224 or above key.

The computer program may then fetch the public key for the second KEK.

An example of moving keys is disclosed in U.S. patent application Ser. No. 18/066,010, the disclosure of which is hereby incorporated, by reference, in its entirety.

In step 230, the computer program may encrypt the first DEK and the second DEK with the second KEK from the KMS of the second cloud environment, and, in step 235, may send the first DEK and the second DEK to the second cloud environment via, for example, an API endpoint on the second cloud environment.

In step 240, the computer program may store the encrypted first DEK and the encrypted second DEK in a database of the second cloud environment. The database may maintain the DEK identifiers, the encrypted DEK values, the status of each DEK (e.g., active, inactive), the associated cloud environment (e.g., cloud 1, cloud 2, etc.), the KEK identifier for DEK identifier (e.g., KEK1), and a timestamp.

In one embodiment, steps 215 to 230 may be repeated for each additional cloud environment (e.g., third cloud environment, fourth cloud environment, etc.).

Figure 3:
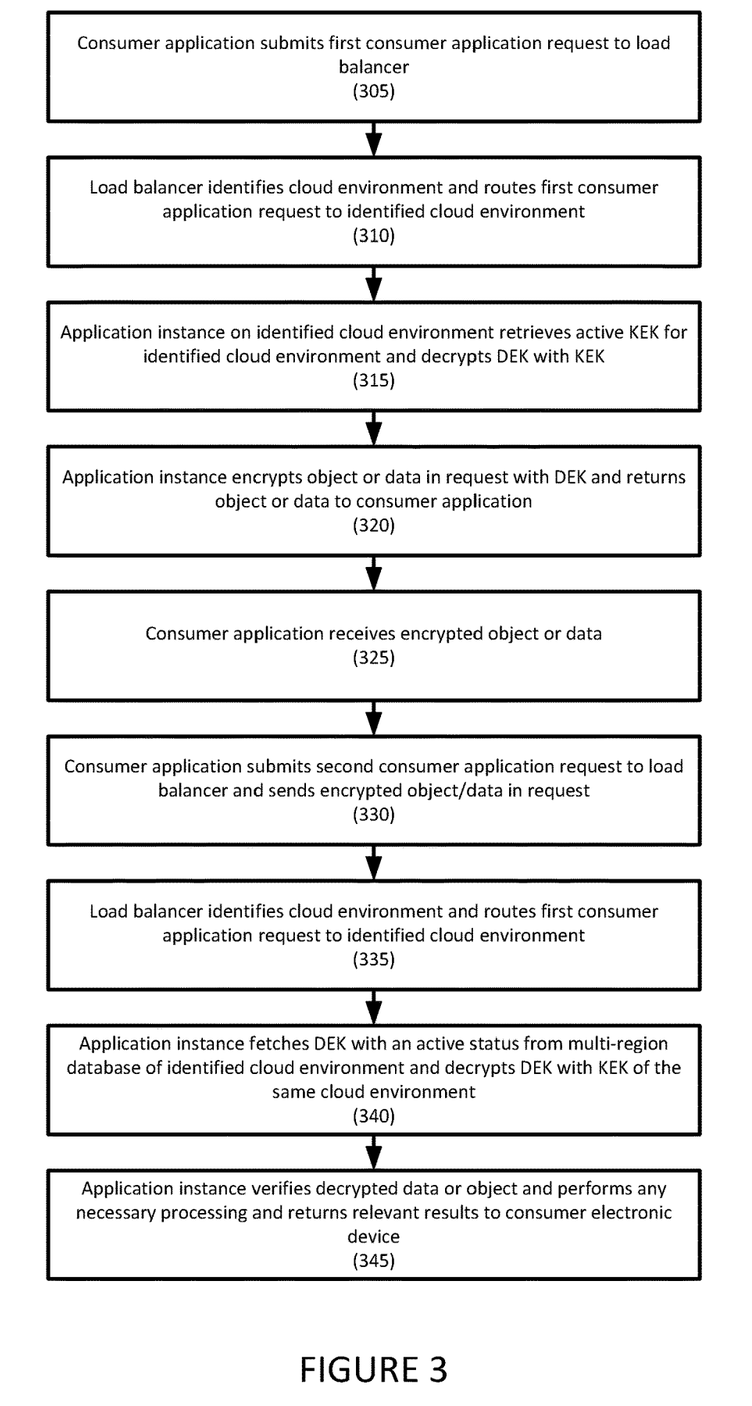
FIG. 3 depicts a method for minimizing impact of breach of encryption and signing keys in multi-cloud environments according to one embodiment.

Referring to FIG. 3, a method of requesting encryption on object/data is disclosed according to an embodiment.

In step 305, a consumer application executed by a consumer electronic device may submit a first consumer application request to a load balancer for processing by a distributed application in a plurality of cloud environments.

For example, the first consumer application request may include an object or data to encrypt.

In one embodiment, the first consumer application request may be for a session token.

As another example, the consumer application may not have the ability to secure encryption keys and may send the first consumer application request to encrypt some data and store encrypted data on the consumer device.

In step 310, the load balancer may identify a cloud environment and may route the first consumer application request to the identified cloud environment. The load balancer may apply a routing rule (e.g., random routing, latency-based routing, geographic-based routing, etc.) to identify the cloud environment.

In step 315, the application instance for the identified cloud environment (e.g., cloud environment 1) that receives the first consumer application request (e.g., application instance 1) may retrieve a DEK with active status for the first environment (e.g., DEK1). It may then decrypt the first DEK with the first KEK.

In step 320, the application instance may encrypt the object or data with the first DEK and may return the encrypted object or data to the consumer application.

In step 325, the consumer application may receive the encrypted object or data.

In step 330, the consumer application may later submit a second consumer application request to decrypt the encrypted data and may send encrypted object/data in the request.

In one embodiment, the consumer application may also provide an identifier for the key used for the encryption.

In one embodiment, the second consumer application request may be for data associated with the session token.

Note that there is no stickiness or statefulness between the first consumer application request and the second consumer application request.

In step 335, the load balancer may route the second consumer application request to one of the plurality of application instances by the load balancer.

In step 340, the application instance that receives the second consumer application request may fetch the DEK having an active status from the database of the identified cloud environment and may decrypt DEK with KEK of the same cloud environment. It may then decrypt the object or data with DEK. The application instance may then return the decrypted object or data to the consumer application.

For example, the application instance that receives the second consumer application request may verify the session token by decrypting the session token and may verify the data inside the session token.

If the key identifier is not available, the application instances may fetch all DEKs in that cloud environment and decrypt all the DEKs with the KEK of that cloud environment. It may then decrypt the object or data with each DEK and identify the valid decrypted data or object.

In step 345, the application instance may verify the decrypted data or object, and performs any necessary processing and returns relevant results to consumer electronic device.

Figure 4:
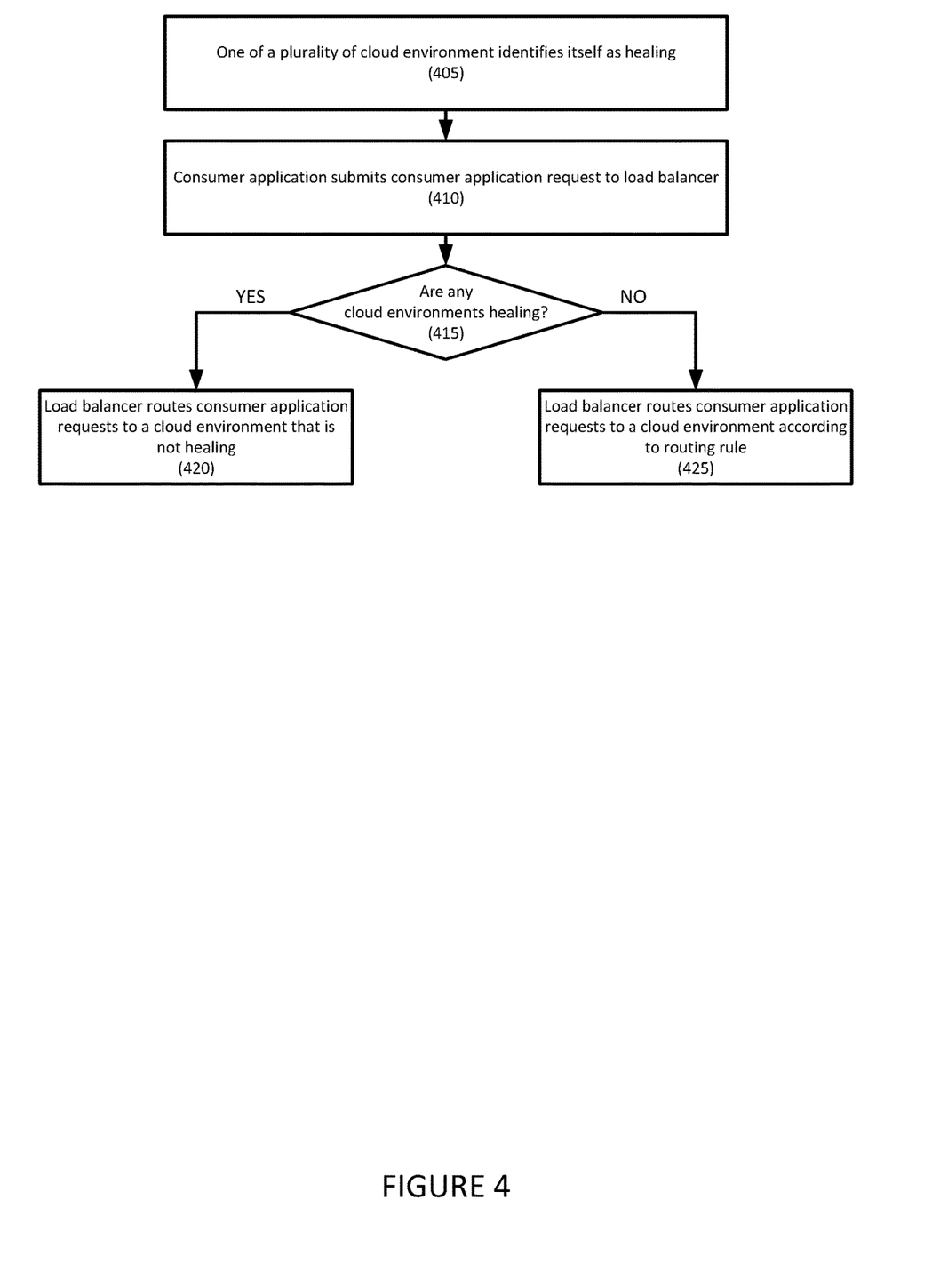
FIG. 4 depicts a method for routing a request while minimizing impact of breach of encryption and signing keys in multi-cloud environments according to another embodiment.

Referring to FIG. 4, a method is disclosed according to an embodiment.

In step 405, one of a plurality of cloud environments (e.g., cloud environment 1) may report itself as healing to a load balancer due to, for example, a key breach. Any suitable manner for notifying the load balancer may be used as is necessary and/or desired.

In step 410, the load balancer may receive consumer application requests from consumer application executed by a plurality of consumer electronic devices. The consumer application requests may be a request encryption or description of data, a request for data, etc.

In step 415, the load balancer may check to see if any cloud environments are healing. If one of the cloud environments is healing, in step 420, the load balancer may route the consumer application requests to a cloud environment that is not healing (e.g., cloud environment 2).

Once the healing is completed, the load balancer may resume routing to all of the cloud environments.

If none of the cloud environments are healing, in step 425, the load balancer may route the consumer application requests to the cloud environments according to a routing rule (e.g., random routing, latency-based routing, geographic-based routing, etc.).

Figure 5:
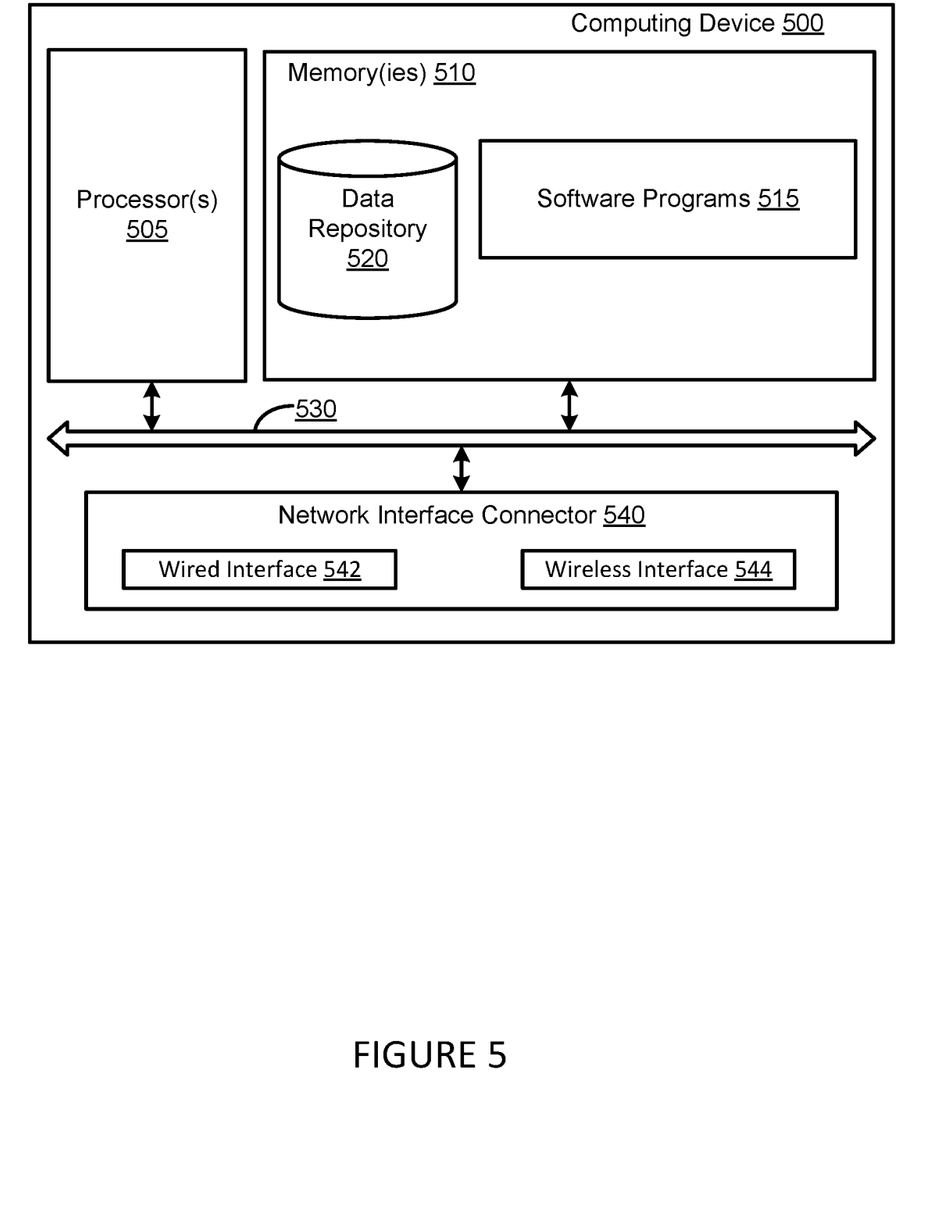
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating keys, comprising:
generating, by a computer program executed by a first cloud environment, a first key encryption key and storing the first key encryption key in a first cloud environment key management service;
generating, by the computer program, a first data encryption key using the first cloud environment key management service;
generating, by the computer program, a second data encryption key for a second cloud environment using the first cloud environment key management service;
encrypting, by the computer program, the first data encryption key with the first key encryption key and the second data encryption key with the first key encryption key;
storing, by the computer program, the first data encryption key encrypted with the first key encryption key and the second data encryption key encrypted with the first key encryption key in a database of the first cloud environment;
generating, by the computer program, a second key encryption key and storing the second key encryption key in a second cloud environment key management service;
receiving, at a load balancer computer program for the first cloud environment and the second cloud environment and from a consumer application, a first consumer application request to encrypt a data;
determining, by the load balancer program via a check, a key breach of the first cloud environment to the load balancer computer program;
routing, by the load balancer computer program, the first consumer application request and the data to one of the cloud environments based on a routing rule, wherein the load balancer routes the first consumer application request to the second cloud environment on the basis that the second cloud environment is not undergoing healing;
retrieving, by an application instance in the second cloud environment, the first data encryption key from the database for the second cloud environment;
decrypting, by the application instance and with a key encryption key for the second cloud environment, the first data encryption key;
encrypting, by the application instance, the data with the decrypted first data encryption key;
returning, by the application instance, the data encrypted with the decrypted first data encryption key to the consumer application;
encrypting, by the computer program, the first data encryption key with the second key encryption key and the second data encryption key with the second key encryption key; and
storing, by the computer program, the first data encryption key encrypted with the second key encryption key and the second data encryption key encrypted with the second key encryption key in the database of the second cloud environment.

2. The method of claim 1, wherein the first data encryption key comprises a symmetric key.

3. The method of claim 2, wherein the symmetric key comprises an AES 256 key.

4. The method of claim 1, wherein the first data encryption key and the second data encryption key comprise asymmetric keys.

5. The method of claim 1, further comprising:
receiving, at the load balancer computer program for the first cloud environment and the second cloud environment and from the first consumer application, the first consumer application request including a request to decrypt the data and an identifier for a data encryption key that was used to encrypt the data, wherein the identifier identifies the first data encryption key and the second data encryption key;

retrieving, by an application instance in the second cloud environment, a data encryption key associated with the identifier from the database for the second cloud environment;

decrypting, by the application instance and with a key encryption key for the second cloud environment, the retrieved data encryption key;

decrypting, by the application instance, the data with the decrypted data encryption key; and returning, by the application instance, the decrypted data to the consumer application.

6. The method of claim 1, further comprising:

receiving, at a load balancer computer program for the first cloud environment and the second cloud environment and from the consumer application, the first consumer application request including a request to decrypt data;

retrieving, by an application instance in the second cloud environment, the first data encryption key and the second data encryption key;

decrypting, by the application instance, the first data encryption key and the second data encryption key with the key encryption key for the second cloud environment;

decrypting, by the application instance, the data with the decrypted first data encryption key and the second data encryption key;

identifying, by the application instance, valid decrypted data; and returning, by the application instance, the valid decrypted data to the consumer application.

7. A non-transitory computer readable storage medium, including instructions stored thereon, which when read and executed by one or more computer processors, cause the one or more computer processors to perform steps comprising:

generating a first key encryption key and storing the first key encryption key in a first cloud environment key management service;

generating a first data encryption key using the first cloud environment key management service;

generating a second data encryption key for a second cloud environment using the first cloud environment key management service;

receiving, at a load balancer computer program for the first cloud environment and the second cloud environment and from a consumer application, a first consumer application request to encrypt a data;

determining, by the load balancer program via a check, a key breach of the first cloud environment to the load balancer computer program;

routing, by the load balancer computer program, the first consumer application request and the data to one of the cloud environments based on a routing rule, wherein the load balancer routes the first consumer application request to the second cloud environment on the basis that the second cloud environment is not undergoing healing;

retrieving, by the second cloud environment, the first data encryption key from the database for the second cloud environment;

decrypting, with a key encryption key for the second cloud environment, the first data encryption key;

encrypting the data with the decrypted first data encryption key;

returning the encrypted data to the consumer application;

encrypting the first data encryption key with the first key encryption key and the second data encryption key with the first key encryption key;

based on a determination by the load balancer program that the first cloud environment is finished healing, storing the first data encryption key encrypted with the first key encryption key and the second data encryption key encrypted with the first key encryption key in a database of the first cloud environment;

generating a second key encryption key and storing the second key encryption key in a second cloud environment key management service;

encrypting the first data encryption key with the second key encryption key and the second data encryption key with the second key encryption key; and storing the first data encryption key encrypted with the second key encryption key and the second data encryption key encrypted with the second key encryption key in the database of the second cloud environment.

8. The non-transitory computer readable storage medium of claim 7, wherein the first data encryption key comprises a symmetric key.

9. The non-transitory computer readable storage medium of claim 8, wherein the symmetric key comprises an AES 256 key.

10. The non-transitory computer readable storage medium of claim 7, wherein the first data encryption key and the second data encryption key comprise asymmetric keys.

11. The non-transitory computer readable storage medium of claim 7, further including instructions stored thereon, which when read and executed by one or more computer processors, cause the one or more computer processors to perform steps comprising:

receiving, from the consumer application, the first consumer application including a request to decrypt the data and an identifier for a data encryption key that was used to encrypt the data, wherein the identifier identifies the first data encryption key and the second data encryption key;

retrieving a data encryption key associated with the identifier from the database for the second cloud environment;

decrypting, with a key encryption key for the second cloud environment, the retrieved data encryption key;

decrypting the data with the decrypted data encryption key; and returning the data to the consumer application.

12. The non-transitory computer readable storage medium of claim 7, further including instructions stored thereon, which when read and executed by one or more computer processors, cause the one or more computer processors to perform steps comprising:

receiving, from the consumer application, the first consumer application request including a request to decrypt the data;

retrieving the first data encryption key and the second data encryption key;

decrypting the first data encryption key and the second data encryption key with the key encryption key for the second cloud environment;

decrypting the data with the decrypted first data encryption key and the second data encryption key;

identifying valid decrypted data; and returning the valid decrypted data to the consumer application.

* * * * *